US008665873B2

(12) United States Patent
Sarikaya et al.

(10) Patent No.: US 8,665,873 B2
(45) Date of Patent: Mar. 4, 2014

(54) NETWORK ADDRESS TRANSLATOR 64 FOR DUAL STACK MOBILE INTERNET PROTOCOL VERSION SIX

(75) Inventors: Behcet Sarikaya, Wylie, TX (US); Yangsong Xia, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 210 days.

(21) Appl. No.: 13/103,148

(22) Filed: May 9, 2011

(65) Prior Publication Data
US 2011/0292857 A1 Dec. 1, 2011

Related U.S. Application Data

(60) Provisional application No. 61/349,064, filed on May 27, 2010.

(51) Int. Cl.
*H04L 12/28* (2006.01)
(52) U.S. Cl.
USPC ............ 370/392; 370/312; 370/466; 709/245
(58) Field of Classification Search
USPC .......................................................... 370/312
See application file for complete search history.

(56) References Cited

U.S. PATENT DOCUMENTS

| | | | | |
|---|---|---|---|---|
| 2004/0136382 | A1* | 7/2004 | Sundquist | 370/400 |
| 2005/0013280 | A1* | 1/2005 | Buddhikot et al. | 370/349 |
| 2005/0068981 | A1* | 3/2005 | Park et al. | 370/466 |
| 2005/0083969 | A1 | 4/2005 | Lee et al. | |
| 2008/0059582 | A1* | 3/2008 | Hartikainen et al. | 709/204 |
| 2008/0285518 | A1* | 11/2008 | Dutta et al. | 370/331 |
| 2010/0157870 | A1* | 6/2010 | Song et al. | 370/312 |
| 2010/0175109 | A1* | 7/2010 | Haddad | 726/3 |
| 2012/0201222 | A1* | 8/2012 | Muhanna et al. | 370/331 |

FOREIGN PATENT DOCUMENTS

| | | |
|---|---|---|
| CN | 101047708 A | 10/2007 |
| WO | 2007022683 A1 | 3/2007 |
| WO | WO 2007022683 A1 * | 3/2007 |

OTHER PUBLICATIONS

RFC 2460 Internet Protocol Version 6 (IPv6) Specification S. Deering, R. Hinden Dec. 1998.*
Home Agent assisted Route Optimization between Mobile IPv4 Networks draft-ietf-mip4-nemo-haaro-00 A. Makela, J. Korhonen Feb. 19, 2010.*
RFC 4607 Source-Specific Multicast for IP H. Holbrook, B. Cain Aug. 2006.*
Foreign Communication From a Related Counterpart Application, PCT Application PCT/CN2011/074075, International Search Report dated Aug. 25, 2011, 4 pages.

(Continued)

*Primary Examiner* — Huy D Vu
*Assistant Examiner* — Kevin Cunningham
(74) *Attorney, Agent, or Firm* — Conley Rose, P.C.; Grant Rodolph; Brandt D. Howell

(57) ABSTRACT

An apparatus comprising a home agent (HA) configured to couple to a mobile node (MN), a network address translation (NAT) server, and an Internet Protocol (IP) version four (IPv4) only host and to associate an IP version six (IPv6) address for an interface with the MN with an IPv4 address for an interface with the IPv4 only host in a NAT state table entry, wherein the NAT state table entry is used to translate an IPv6 packet associated with the MN to an IPv4 packet associated with the IPv4 only host.

32 Claims, 4 Drawing Sheets

(56) References Cited

OTHER PUBLICATIONS

Foreign Communication From a Related Counterpart Application, PCT Application PCT/CN2011/074075, Written Opinion dated Aug. 25, 2011, 8 pages.
Bradner, S., "Key Words for Use in RFCs to Indicate Requirement Levels," RFC 2119, Mar. 1997.
Rose, M., "Writing I-Ds and RFCs Using XML," RFC 2629, Jun. 1999.
Srisuresh, P., et al., "IP Network Address Translator (NAT) Terminology and Considerations," RFC 2663, Aug. 1999.
Levkowetz, H., et al., "Mobile IP Traversal of Network Address Translation (NAT) Devices," RFC 3519, Apr. 2003.
Johnson, D., et al., "Mobility Support in IPv6," RFC 3775, Jun. 2004.
Audet, F., et al., "Network Address Translation (NAT) Behavioral Requirements for Unicast UDP," RFC 4787, Jan. 2007.
Rosenberg, J., "Interactive Connectivity Establishment (ICE): A Protocol for Network Address Translator (NAT) Traversal for Offer/Answer Protocols," RFC 5245, Apr. 2010.
Guha, S., et al., "NAT Behavioral Requirements for TCP," RFC 5382, Oct. 2008.
Soliman, H., "Mobile IPv6 Support for Dual Stack Hosts and Routers," RFC 5555, Jun. 2009.
Bao, C., et al., "IPv6 Addressing of IPv4/IPv6 Translators," RFC 6052, Oct. 2010.
Bagnulo, M., et al., "DNS64: DNS Extensions for Network Address Translation from IPv6 Clients to IPv4 Servers," draft-ietf-behave-dns64-09.txt, Mar. 30, 2010.Bagnulo, M., et al., "DNS64: DNS Extensions for Network Address Translation from IPv6 Clients to IPv4 Servers," draft-ietf-behave-dns64-09.txt, Mar. 30, 2010.
Bagnulo, M., et al., "Stateful NAT64: Network Address and Protocol Translation from IPv6 Clients to IPv4 Servers," draft-ietf-behave-v6v4-xlate-stateful-11.txt, Mar. 30, 2010.
Haddad, W., et al., "A Note on NAT64 Interaction with Mobile IPv6," draft-haddad-mext-nat64-mobility-harmful-01.txt, Apr. 28, 2010.
Li, X., et al., "IP/ICMP Translation Algorithm," draft-ietf-behave-v6v4-xlate-20.txt, May 18, 2010.
Li, X., et al., "IP/ICMP Translation Algorithm," draft-ietf-behave-v6v4-xlate-23.txt, Sep. 18, 2010.
Korhonen, J., et al., "Analysis for Solution Proposals for Hosts to Learn NAT63 Prefix," draft-korhonen-behave-nat64-learn-analysis-02.txt, Feb. 22, 2011.
Boucadair, M., et al., "IPv4-Embedded IPv6 Multicast Address Format," draft-boucadair-behave-64-multicast-address-format-01.txt, Feb. 9, 2011.
Bao, C., et al., "IPv6 Addressing of IPv4/IPv6 Translators," draft-ietf-behave-address-format-10.txt, Aug. 16, 2010.
Bao, C., et al., "IPv6 Addressing of IPv4/IPv6 Translators," draft-ietf-behave-address-format-08.txt, May 16, 2010.
Bagnulo, M., et al., "DNS64: DNS Extensions for Network Address Translation from IPv6 Clients to IPv4 Servers," RFC 6147, Apr. 2011.
Bagnulo, M., et al., "Stateful NAT64: Network Address and Protocol Translation from IPv6 Clients to IPv4 Servers," RFC 6146, Apr. 2011.
Li, X., et al., "IP/ICMP Translation Algorithm," RFC 6145, Apr. 2011.
Haddad, W., et al., "A Note on NAT64 Interaction with Mobile IPv6," draft-haddad-mext-nat64-mobility-harmful-02.txt, Mar. 13, 2011.
Sarikaya, B., "Multicast Support for NAT64," draft-sarikaya-behave-mcast4nat64-01.txt, Jan. 25, 2011.
Sarikaya, B., "Multicast Support for NAT64," draft-sarikaya-behave-mcast4nat64-03.txt, Mar. 28, 2011.
Kiviniemi, Teemu, "Implementation of an IPv4 to IPv6 Multicast Translator," Helsinki University of Technology, Master's Thesis, Oct. 25, 2009, 81 pages.
Venaas, S., et al., "An IPv4—IPv6 Multicast Translator," draft-venaas-behave-mcast64-01.txt, Jul. 8, 2009.
Venaas, S., et al., "An IPv4—IPv6 Multicast Translator," draft-venaas-behave-mcast64-02.txt, Dec. 22, 2010.
Deering, S., et al., "Internet Protocol, Version 6 (IPv6) Specification," Network Working Group, RFC 2460, Dec. 1998, 40 pages.

* cited by examiner

NETWORK ADDRESS TRANSLATOR 64 FOR DUAL STACK MOBILE INTERNET PROTOCOL VERSION SIX

CROSS-REFERENCE TO RELATED APPLICATIONS

The present application claims the benefit of U.S. Provisional Patent Application No. 61/349,064 filed May 27, 2010 by Behcet Sarikaya et al. and entitled "NAT64 For Dual Stack Mobile IPv6," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, Wireless Fidelity (WiFi) based on the IEEE 802.11 standard, and Worldwide Interoperability for Microwave Access (WiMAX) based on the IEEE 802.16 standard. Mobile IPv6 (MIPv6) is a protocol that allows a mobile node (MN), such as a mobile device, to handle its mobility management. As such, the MN may communicate with a MIPv6 home agent (HA) for the MN, e.g., via an access router (AR). Technologies are also being developed to allow carriers to migrate from IP version four (IPv4) to IPv6 due to IPv4 address depletion. Such migration technologies do not address MN mobility.

SUMMARY

In one embodiment, the disclosure includes an apparatus comprising a HA configured to couple to a MN, a network address translation (NAT) server, and an IP version four (IPv4) only host and to associate an IPv6 address for an interface with the MN with an IPv4 address for an interface with the IPv4 only host in a NAT state table entry, wherein the NAT state table entry is used to translate an IPv6 packet associated with the MN to an IPv4 packet associated with the IPv4 only host.

In another embodiment, the disclosure includes a network component comprising a receiver configured to receive a multicast data packet from an IPv4 host, a logic circuit configured to obtain an IPv6 address for the multicast packet based on an IPv4 address in the multicast packet and duplicate the multicast packet for each MN that is subscribed to the IPv6 address into a corresponding IPv6 packet, and a transmitter configured to send each duplicate IPv6 packet to the corresponding MN.

In yet another embodiment, the disclosure includes a method comprising receiving an IPv6 packet from a MN, setting an IPv6-only flag in a binding cache entry (BCE) for the MN that is not previously set if an IPv6 prefix in a destination address in the IPv6 packet is detected in a prefix table, translating the IPv6 packet to an IPv4 packet using a NAT state table entry that matches a source address in the IPv6 packet, and forwarding the IPv4 packet to an IPv4-only host associated with the destination address.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A plurality of techniques are being standardized for IPv6 migration, including a NAT 64 (NAT64) disclosed in draft-ietf-behave-v6v4-xlate-stateful-12, July 2010 by M. Bagnulo et al. entitled "Stateful NAT64: Network Address and Protocol Translation from IPv6 Clients to IPv4 Servers", which is incorporated herein by reference. NAT64 may be used with a Domain Name System 64 (DNS64) disclosed in draft-ietf-behave-dns64-11, October 2010 by M. Bagnulo et al. entitled "DNS64: DNS Extensions for Network Address Translation from IPv6 Clients to IPv4 Servers", which is incorporated herein by reference. NAT64 and DNS64 may also be used with a translation algorithm disclosed in draft-ietf-behave-v6v4-xlate,-23 Sep. 2010 by X. Li et al. entitled "IP/ICMP Translation Algorithm", which is also incorporated herein by reference. NAT64, DNS64, and the translation algorithm may enable IPv6-only hosts to communicate with IPv4-only hosts or servers. NAT64 was designed for fixed hosts and several problems may occur when used for MNs, as described in draft-haddad-mext-nat64-mobility-harmful-01, April 2010 by W. Haddad et al. entitled "A Note on NAT64 Interaction with Mobile IPv6", which is incorporated herein by reference.

Disclosed herein are systems and methods for implementing NAT64 with Dual Stack MIPv6 (DSMIPv6) to support MN mobility. The methods may allow an IPv6-only MN that receives host based mobility management using DSMIPv6 to communicate with IPv4-only servers or hosts. The system may comprise a HA and a NAT64 server that may be collocated or hosted separately in the system. The system may be configured to handle prefix change or mismatch, e.g., when the MN moves to a new network and establishes an interface with a new local HA. Prefix change may be handled using a NAT state table at the HA that associates IPv6 addresses with IPv4 addresses. The NAT state entries may also be linked to corresponding binding cache entries for corresponding MNs. An improved keep-alive mechanism may also be used to preserve battery power on the MN. The system may also support multicast in DSMIPv6 to enable the IPv6-only MN to receive multicast data from an IPv4-only server. Additionally, initiation for route optimization may be disabled at the MN.

Figure 1:
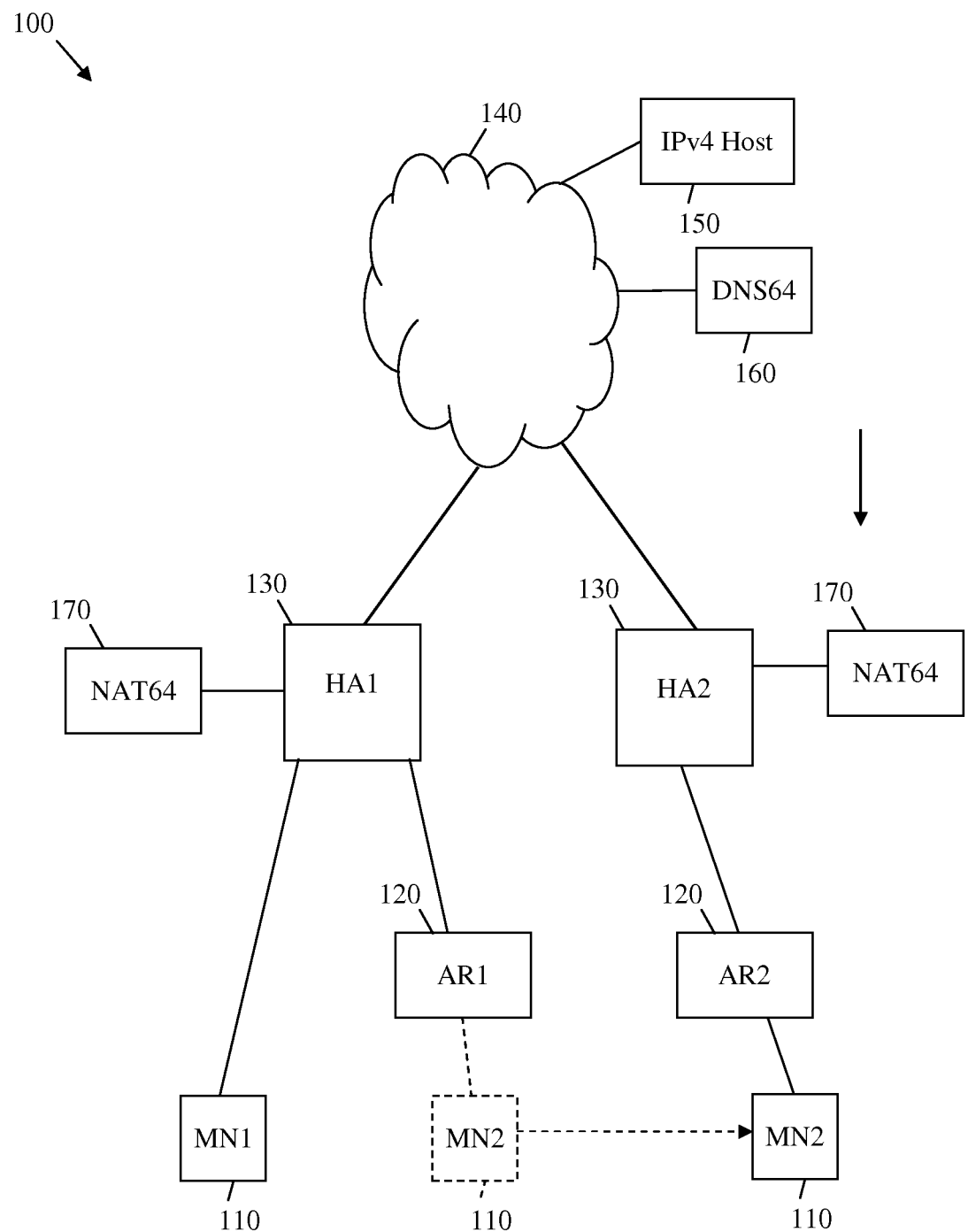
FIG. 1 is a schematic diagram of one embodiment of a wireless access network system.

FIG. 1 illustrates an embodiment of a wireless access network system 100, which may support DSMIPv6 to handle MN mobility. DSMIPv6 is a protocol that extends MIPv6 capabilities to allow MNs to request from their associated HAs to tunnel IPv4 and IPv6 packets, which may be addressed to MNs' home addresses, e.g., to the MNs' assigned IPv4 and IPv6 care-of addresses. The MNs 110 and the HAs 130 may also be referred to as dual stack MNs and dual stack HAs, respectively. The wireless access network system 100 may comprise a plurality of MNs 110, one or more ARs 120 that may be coupled to one or more MNs 110, and a plurality of HAs 130 that may be coupled to the MNs 110 and/or the ARs 120. Additionally, the wireless access network system 100 may comprise a service provider network 140 that may be coupled to the HAs 130, one or more IPv4 servers or hosts 150, one or more DNS64 servers 160, and a plurality of NAT64 servers 170. The NAT64 servers 170 may be coupled to or collocated with the HAs 130 or may be located at the service provider network 140.

The MNs 110 may be any mobile devices that use the ARs 120 and/or the HAs 130 to access the server provider network 140 or other networks (not shown). Specifically, the MNs 110 may comprise mobile user-oriented devices that communicate with the service provider network 140. For example, the MNs 110 may comprise cellular telephones, notebook computers, personal digital assistants (PDAs), any other wireless devices, or combinations thereof. Additionally or alternatively, the MNs 110 may comprise fixed communications devices, such as desktop computers or set top boxes, which may be connected to the ARs 120 and/or the HAs 130 using wireless technology.

The MNs 110 may be located in one or more wireless access networks (not shown), e.g., within the coverage range of the wireless access networks, which may allow access to the service provider network 140. The wireless access networks may also comprise or may be coupled to the ARs 120 and the HAs 130. The wireless access networks may be any wireless networks that exchange communications with the MNs 110, the ARs 120, and the service provider network 140 via the HAs 130. Examples of wireless access networks may include a third Generation Partnership Project (3GPP) network and an IEEE 802.11 Wireless Local Area Network (WLAN), also referred to as WiFi network. For example, a first MN 110 (MN1) may be coupled directly to a first HA 130 (HA1) and a second MN 110 (MN2) may be coupled to HA1 via a first AR 120 (AR1) in a first wireless access network. MN2 may then move or migrate from the first wireless access network to a second wireless access network, e.g., using a hand-over procedure. As such, the MN2 may disconnect from HA1 (and AR1) and establish a new active interface with HA2 (via AR2). The dashed lines in FIG. 1 represent the migration of MN2 from the first wireless access network to the second wireless access network.

The ARs 120 may be any devices or components that are configured to provide the MNs 110 access to the HAs 130. The HAs 130 may be any devices or components that provide the MNs 110 connectivity and/or access to the service provider network 140 and handle mobility management for the MNs 110 based on, for example, the PMIPv6 and DSMIPv6 protocols. Mobility management may comprise binding traffic flows, such as IPv6 and/or IPv4 traffic flows, to any wireless access network where the MNs 110 establish an active interface. The flows may correspond to services provided to the MNs 110 by the service provider network 140 and/or other external networks (not shown). The HAs 130 may forward one or more flows to the MNs 110 directly or via any of the ARs 120 that may have an active interface with the MNs 110. The flows may be bound using a binding cache at each AR 120. A binding cache may comprise one or more binding cache entries BCEs that map the destination addresses in the packets to the HAs 130 that are associated with the MNs 110. Each BCE may map a MN 110 address (e.g., IPv6 address) to a HA 120 care-of-address (CoA) that is associated with the MN 110.

The service provider network 140 may be any network that provides services to the MNs 110, e.g., via the wireless access networks. For instance, the service provider network 140 may be an Internet Service Provider (ISP), a network service provider (NSP), an application service provider (ASP), or combinations thereof. The services may be provided to the MNs 110 in the form of upstream and/or downstream IP packets, such as IPv6 packets and/or IPv4 packets, and may comprise data, text, voice, video, and/or any other services. The packets may be part of an IPv6 and/or IPv4 flow that may be identified by a source IP address, a destination IP address, a transport protocol number, a source port number, a destination port number, or combinations thereof. The services may be directed between the service provider network 140 and the wireless access networks using the HAs 130.

The service provider network 140 may comprise or may be coupled to one or more IPv4 hosts 150 and optionally one or more IPv6 hosts (not shown). The IPv4 hosts 150 may be IPv4-only hosts or servers that send and/or receive IPv4 packets and services to the MNs 110 but do not communicate IPv6 packets and services. The IPv4 packets may comprise IPv4 addresses, which may be about 32 bits long. The IPv4 packets may be sent to IPv4 and/or IPv6 MNs 110. At least some of the MNs 110 may be IPv6-only hosts that send and/or receive IPv6 packets but not IPv4 packets.

The DNS64 server 160 and the NAT64 servers 170 may be configured to enable IPv6-only hosts, such as a MN 110 that is assigned an IPv6 address, to communicate with IPv4-only hosts or servers that handle IPv4 but not IPv6 addresses, such as the IPv4 host 150. One or more DNS64 servers 160 may assign an IPv6 prefix for each NAT64 server 170. The NAT64 servers 170 may use the assigned IPv6 prefixes to translate the IPv4 addresses and packets from one or more IPv4 hosts 150 into IPv6 addresses and packets for the MNs 110. The packets may be translated and forwarded in the direction from the MNs 110 to the IPv4 host 150 and vice versa.

One of the issues of implementing NAT64 in DSMIPv6 is handling the mobility of the MNs 110, such as when the MNs 110 move between different wireless access networks. The DNS64 server 160 may use the IPv6 prefix assigned to the NAT64 IPv6 interface in the domain or wireless access network to translate IPv4 addresses to corresponding IPv6 addresses and vice versa. The IPv6 prefix is referred to herein as Pref64, as in draft-ietf-behave-v6v4-xlate-stateful-12. The Internet Engineering Task Force (IETF) Request for Comment (RFC) 6052, which is incorporated herein by reference, defines two types of prefixes: a well-known prefix and a network-specific prefix (NSP). If a well-known prefix (e.g., 64:FF9B::/96) is used, then the MN 110 may get the same mapping when moving or migrating between different wireless access networks.

If NSPs are used instead, then some mobility issues may need to be addressed, as described in draft-korhonen-behavenat64-learn-analysis-02, February 2011 by J. Korhonen et al. entitled "Analysis of Solution Proposals for Hosts to Learn NAT64 Prefix", which is incorporated herein by reference. The mobility issues may result from the MNs 110 using different NSPs assigned by the DNS64 servers 160 than the NSPs configured for the NAT64 servers 170. For example, a MN 110 may move to a wireless access network associated with a NAT 64 server 170 that is configured with a NSP and then obtain from the DNS64 server 160 a different NSP.

When the MN 110 moves from a first wireless access network to a second wireless access network, the MN 110 may send a DNS request to obtain a NSP using one of two schemes. The MN 110 may tunnel the DNS request for NSP to the local HA 130 in the new wireless access network, which may in turn tunnel the request to a DNS64 server 160. Tunneling the DNS request via the local HA 130 may cause no conflict in NSP assignment since the DNS64 server 160 may be synchronized with the local NAT64 server 170 that is associated with the local HA 130. Alternatively, the MN 110 may send the DNS request locally via the new wireless access network to the DNS64 server 160. In this case, the NSP assigned to the MN 110 by the DNS64 server 160 may not be recognized by the local NAT64 server 170, which may prevent proper translation between IPv4 to IPv6 packets for the MN 110 and thus prevent the packets from arriving to their intended destination. This situation is referred to as a prefix mismatch.

To support mobility for the MNs 110, the MN 110 may be configured to reverse tunnel their packets to a local HA 130 when roaming (between different wireless access networks). The local HA 130 may act as the MN's default router. When forwarding packets sent by the MN 110, the HA 130 may first check a source address (SA) field of an inner header in its binding cache to find the corresponding BCE for this MN's home address. The default HA 130 may further check if the destination address' prefix matches a Pref64 in a prefix table for the HA 130, which may be associated or linked to the DNS64 server 170. If a match is found, an IPv6-only flag in the BCE for the MN 110 may be set, e.g., if the IPv6-only flag is not set already.

In an embodiment, the HA 130 and the NAT64 server 170 may be collocated, e.g., in the same network component or entity. As such, the HA 130 may create an entry in a "NAT state" table that associates a MN source address and IPv6 source port pair with an IPv4 interface address and an IPv4 source port, such as <MN source address, IPv6 source port><--><IPv4 Interface address, IPv4 source port>. The HA 130 may include the IPv6-only flag and the Pref64 in the NAT state entry and link the NAT state entry to the HA's BCE for the MN 110. The HA 130 may also add to this NAT state entry a keepalive interval, K, which may be used to ensure that the HA 130 or the collocated NAT64 server 170 initiates NAT keepalive messages, e.g., periodically based on the interval K, instead of the MN 110 to refresh the NAT state entry. Since the MN 110 may not need to initiate the keepalive messages, the MN 110 may stay longer in a dormant or sleep mode and thus preserve its battery power. The keepalive mechanism is described in more detail below.

The HA 130 may forward the IPv6 packets from the MN 110 to the NAT64 server 170, which may translate the IPv6 packets into IPv4 packets using the algorithm described in draft-ietf-behave-v6v4-xlate-stateful-12. Alternatively, the HA 120 may translate the IPv6 packets using the corresponding NAT state entry. The IPv4 packets may then be sent to the IPv4 host 150. The procedure above for creating a new NAT state may be repeated when a new session is started by a MN 110, e.g., when a new MN 110 attaches to the local HA 130 or when a previous NAT state entry for the MN 110 has expired and the MN 110 starts sending IPv6 packets again. When forwarding subsequent packets for the same (e.g., unexpired) session corresponding to <MN source address, source port>, the HA 130 may locate the corresponding entry in the NAT state table and create the corresponding IPv4 packet using this entry.

When the HA 13 receives an IPv4 packet from the IPv4 host 150 that is addressed to its IPv4 interface, the HA 130 may search the NAT table for a corresponding MN IPv6 source address and port. For example, the tuple <203.0.113.1, 2000> may be matched to the NSP of 2001:FF00::/64 and a source port of 1500. The HA 130 may create an IPv6 packet from the IPv4 packet using this information. The IPv4 packet may be translated into an IPv6 packet using the algorithm presented described in draft-ietf-behave-v6v4-xlate-23. The HA 130 may then fetch the MN's BCE and find the care-of address for the MN 110. The HA 130 may encapsulate the IPv6 packet and send it to the corresponding MN 110, e.g., via an AR 120.

In another embodiment, the HA 130 and the NAT64 server 170 may be hosted separately or may not be collocated. As such, the NAT64 server 170 may translate the received IPv4 packets and forward the packets as IPv6 packets to the HA 130. The HA 130 may then search its binding cache to match the IPv6 packet with a care-of address of a MN 110. If a match is found, the HA 130 may encapsulate the packet and send it to the corresponding MN 110.

In the case of a handover, the MN 110 may move to a new wireless access network and send a DNS request locally to a DNS server of the new network that may be configured with a different Pref64 than the MN 110. This may create a prefix mismatch, as described above. For instance, the MN 110 may obtain a different synthetic quad A address record (AAAA RR) with a different IPv6 address of the destination.

The MN 110 may then reverse tunnel its IPv6 packet that is destined to an IPv4-only server to the HA 130. Hence, the HA 130 may check the source address (e.g., the MN's home address) of the inner header in the binding cache for any entry with a set IPv6-only flag. The HA 130 may then check the destination address prefix in the binding cache. If the prefix does not match, the HA 130 may check the prefix table for a match with the destination address prefix. If a match is found, a new binding cache entry may be added with the new Pref64. The HA 130 may route the MN's packet with the new Pref64. The packet may take a longer path or may not reach the destination, e.g., due to the lack of a roaming agreement with the new wireless access network. If the prefix does not match, the HA 130 may forward the packet since this packet may be intended to another IPv6 destination host. If the IPv6-only flag is not set and the prefix matches, then this may be the first packet sent to a new IPv4-only server. The HA 130 may process the packet as described above.

Another issue of implementing NAT64 in DSMIPv6 is efficient handling of the keepalive procedure for NAT entries during active MN sessions. Typically, the NAT64 server 170 may maintain a NAT state table. The NAT state may be a "soft" state that may expire if it is not refreshed during a determined time interval. The NAT state table may comprise one or more mapping or binding entries for one or more corresponding MNs 110, which may be deleted at the end of the time interval if no activity is detected during that interval. The time interval may be determined using timer values, e.g., at a minimum of about two minutes and a maximum of about five minutes for a User Datagram Protocol (UDP) as described in RFC 4787, which is incorporated herein by reference, and of about two hours and four minutes as described in RFC 2663 for a Transmission Control Protocol (TCP) described in RFC 5382, also both incorporated herein by reference. The values above are recommended in draft-ietf-behave-v6v4-xlate-stateful-12. However, some typically used NAT64 servers or devices may have non-deterministic and relatively short expiration times, such as in the case of UDP-based bindings.

Typically, the MN 110 may initiate an outbound refresh to keep the mapping or binding entry for the MN 110 alive. The MN 110 may send a NAT keepalive message, as described in RFC 5245, which is incorporated herein by reference. The MN 110 may go to sleep mode when inactive to reduce battery usage. However, sending NAT keepalive messages for outbound refresh may interrupt the sleep mode and thus drain the MN's 110 battery. To avoid draining the battery, the MN 110 may not be allowed to send NAT keepalive messages. Instead, the NAT state at the NAT64 server 170 may be integrated with the binding cache at the HA 130. The HA 130 may refresh the binding entry for the MN 110 and send keepalive messages instead of the MN 110 to the NAT64 server 170 to refresh the NAT state at the NAT64 server 170, e.g., to keep track of the mobility of the MN 110.

In this case the HA 130 is collocated with the NAT64 server 170, a keepalive interval may be used to send NAT keepalive messages. The NAT keepalive messages may be Internet Control Message Protocol (ICMP) Echo Request messages, as described in RFC 3519, which is incorporated herein by reference. An ICMP version six (ICMPv6) Echo Request message may be encoded with a UDP header. The packet's destination address may be the destination address associated with the keepalive interval. The packet's source address may be the MN's 110 home address. The keepalive interval may be used to keep track of the inactivity of the MN's 110 session with the corresponding NAT64 server 170 and the corresponding IPv4 host 150. The UDP header in the message may comprise the source and destination port numbers of the NAT binding at the NAT64 server 170. The HA 130 may send the ICMP Echo Request message to the NAT64 server 170 that serves as an outbound refresh message for the MN 110 session. The HA 130 may also receive a corresponding ICMP Echo Reply message from the NAT64 server 170 that serves as an inbound refresh message, e.g., for incoming packets from the IPv4 host 150.

The ICMPv6 Echo Request message may be translated at the NAT64 server 170 into an ICMP version four (ICMPv4) Echo Request message with a UDP header based on the translation rules defined in draft-ietf-behave-v6v4-xlate-stateful-12. The UDP header may preserve the source and destination port numbers that may be needed to match with a NAT state entry or binding. The NAT64 server 170 may also refresh the NAT state for this session. An ICMPv4 Echo message may also be sent to the IPv4 host 150 as an IPv4 packet with a UDP header. The IPv4 host 150 may send in return an IPv4 Echo Reply message, which may be translated into an ICMPv6 Echo Reply message that is forwarded to the HA 130.

A keepalive interval of K seconds may be implemented to control the frequency of the keepalive messages. K is a protocol constant that may be equal to a determined or default integer value. The default value may be less than the timeout value used by the NAT64 server 170. For instance, K may be set to the default value of about 110 seconds, as described in RFC 3519. If the HA 130 is collocated with the NAT64 server 170, the HA 130 may forward any subsequent packets for the same session that corresponds to <MN source address, source port> and refresh the keepalive interval. The HA 130 may not implement an inbound refresh and may not forward an ICMPv6 Echo Reply message to the MN 110. The incoming packets for this session may not trigger a refresh of the keepalive interval, since this interval is designated for outbound refresh. Instead, the IPv4 host 150 may be in charge of implementing the inbound refresh.

Another issue of implementing NAT64 in DSMIPv6 is supporting multicasting packets from an IPv4-only host to IPv6-only MNs. Typically, the NAT64 protocol is designed for unicast communications and the translation algorithm defined in draft-ietf-behave-v6v4-xlate-23 may not translate multicast packets. As such, an IPv6-only host, such as a MN 110, may not receive multicast data from IPv4-only servers, such as the IPv4 host 150. In some applications, multicast communications may be needed for the MNs 110 in DSMIPv6, including multicast communications from the IPv4 host 150 to an IPv6-only MN 110. This may be enabled using a multicast translation scheme for DSMIPv6, which may be implemented for any source multicast (ASM), any source specific multicast (SSM), or both.

A multicast scheme may be implemented to allow one or more IPv6-only MNs 110 to receive IPv4 multicast data from the IPv4 host 150 or another IPv4-only content provider based on the multicast scheme supported in DSMIPv6 as described in RFC 3775, which is incorporated herein by reference. The multicast scheme may be implemented in the case of collocated or separated HA 130 and NAT64 server 170. An IPv6-only MN 110 may join an IPv4 multicast group by sending a multicast listener discover (MLD) Membership Report message to the HA 130. The message may be sent in the tunnel established between the MN 110 and the HA 130. The MN 110 may use a synthesized IPv6 address in the message based on an IPv4 multicast group address. For example, a /96 prefix may be used for any source multicast referred to as ASM_MPREFIX64 followed by an IPv4 multicast group address a.b.c.d. The ASM_MPREFIX64 may be in the form of FF7×8x::/96, as defined in draft-boucadair-behave-64-multicast-address-format-01, February 2011 by M. Boucadair et al. entitled "IPv4-Embedded IPv6 Multicast Address Format", which is incorporated herein by reference, where M bits may be set to about one (M is an integer). The join message from the MN 110 for the group ASM_MPREFIX64:a.b.c.d may be received by a multicast router at the HA 130.

Each HA 120 may be assigned a unique MPREFIX64, one for ASM and another for SSM, as described in draft-boucadair-behave-64-multicast-address-format-01, February 2011 by M. Boucadair et al. entitled "IPv4-Embedded IPv6 Multicast Address Format". A MN 110 may then learn the HA's 130 assigned value and create an IPv6 multicast address based on the IPv4 group address a.b.c.d that the MN 110 intends to join. The HA 130 may act as a multicast anchor that checks the group address and recognizes ASM_MPREFIX64. The HA 130 may check that the last about 32 bits is an IPv4 multicast address in the range from about 224/8 to about 239/8. If the bits are confirmed, then the HA 130 may join a.b.c.d using Internet Group Management Protocol (IGMP) on its IPv4 interface. The HA 130 may identify the MN 110 from the tunnel on which the message was received and add the multicast group address to a multicast state (e.g., table) entry associated with the MN's 110 binding cache entry. The HA 130 may also set an IPv6-only bit if the bit was not previously set.

When the HA 130 receives multicast data for the group a.b.c.d, the HA 130 may first obtain the IPv6 address ASM_MPREFIX64:a.b.c.d and then check if at least one MN 110 is subscribed to this address from the binding cache and the multicast state. The HA 130 may then translate the received IPv4 multicast data packet into an IPv6 multicast data packet. The HA 130 may include in the packet a destination address that corresponds to the IPv6 group address ASM_MPREFIX64:a.b.c.d and a source address that corresponds to the HA's 130 IPv6 interface address. A Type of Service (TOS) field in the IPv4 packet may be copied into an IPv6 Traffic Class field in the IPv6 packet. Both an IPv4 Protocol field and a time to live (TTL) field in the IPv4 packet may be copied into an IPv6 Next Header and a Hop Limit field, respectively, in the IPv6 packet. An IPv4 payload in the IPv4 packet may also be copied into an IPv6 payload in the IPv6 packet. Additionally, a UDP checksum may be updated, which may complete the packet translation process, e.g., as described in draft-sarikaya-behave-mcast4nat64-03, March 2011 by B. Sarikaya entitled "Multicast Support for NAT64", which is incorporated herein by reference. The HA 130 may duplicate the packet for each MN 110 of the group and send each duplicate packet via a corresponding tunnel to the individual MNs 110.

Further any IPv4 fragments sent by the routers or the HAs 130 may be translated into IPv6 packets with IPv6 Fragment Headers. A Fragmentation Offset field in the received packet may be copied into a corresponding field in the Fragment Header. An about 16-bit Identification field in the received packet may be copied into about low-order 16 bits of the IPv6 Fragment Header Identification field. The high-order bits of the 32-bit IPv6 Fragment Header Identification field may be set to about zero. A More Fragments (MF) flag in the received packet may be copied to a corresponding field in the IPv6 Fragment Header, e.g., as described in draft-sarikaya-behave-mcast4nat64-03.

The multicast translation described above may not be MN agnostic, e.g., may be aware of the MN members of a multicast group. The HA 130 may receive the join message from the MN 110 and then update the membership database that is connected to the binding cache. The HA 130 may have to be aware of all the MN members of each IPv4 group to correctly duplicate the data packets and tunnel the packets to the individual MNs 110 of the group. The multicast translation scheme above may be implemented for the ASM case. The SSM case may also be supported similar to ASM case. In the SSM case, the IPv4 multicast addresses may use a 232.0.0.0/8 prefix and the IPv6 multicast addresses may use a FF3x 00008x::/96 prefix. The IPv6 prefix may be referred to as SSM_MPREFIX64, as described in draft-boucadair-behave-64-multicast-address-format-01, where M bits may be set to about one. Since SSM translation may require a unique address for each IPv4 multicast source, an IPv6 unicast prefix may be configured for the translator (e.g., the HA 130 and/or NAT64 server 170) to represent IPv4 sources. This prefix may be pre-appended to IPv4 source addresses in the received packets. The prefix may also be routed towards the translator on the IPv6 network, e.g., to enable reverse path forwarding for multicast and/or to inform other Protocol Independent Multicast (PIM) routers about the correct destination for PIM (S,G) Join messages.

During a handover, multicast translation may depend on how the MPREFIX64 is configured. The MN 110 may obtain a different MPREFIX64 locally after moving to a new wireless access network. The MN 110 may send a join request (a MLD Report message) with a new multicast group address to the HA 130 in a tunnel. The HA 130 may add this group address to its membership database. The HA 130 may add the new MPREFIX64 to the multicast prefix table and may set an IPv6-only flag in the binding cache for this MN 110.

In an embodiment, the HA may support SSM using IGMPv3 on an upstream interface of the HA. When an IPv6-only MN joins a source specific group (S,G), the MN may send a MLD version two (MLDv2) Join message, e.g., a MLDv2 membership report message), to the HA. The MLDv2 Join message may comprise an IPv4 address part of an IPv6 group address that includes a 232/8 prefix. The HA may receive and convert the MLDv2 Join message into an IGMPv3 Join message, e.g., an IGMPv3 membership report, and then and send this message to a neighboring router which supports IGMPv3. In another embodiment, the HA may support SSM using PIM on an upstream interface of the HA. When an IPv6-only MN joins a source specific multicast group (S,G), the MN may send a MLD version two (MLDv2) Join message, e.g., a MLDv2 membership report message), to the HA. The MLDv2 Join message may comprise an IPv4 address part of an IPv6 group address that includes a 232/8 prefix. The HA may receive and convert the MLDv2 Join message into a PIN Join message, and then establish a session with an upstream PIM router to send this PIN Join message. The PIM router may be a neighbor or may be several hops away from the HA.

Another issue of implementing NAT64 in DSMIPv6 is the handling of route optimization. Route optimization (RO) in DSMIPv6 may be used to avoid the triangular routing of packets to the corresponding destination by enabling the MN to directly send the packets to their destination, e.g., as described in RFC3775. RO may be established using control signaling that involves the HA 130, the MN 110, and the corresponding destination node or entity. After RO is established, the MN 110 may send its packets directly to the corresponding node. The source address of these packets may be the care-of address and the MN 110 home address may also be included in an extension header referred to as a home address option. All RO packets may comprise extension headers.

Typically in DSMIPv6, the MNs may initiate RO with the corresponding nodes when they move to a new wireless access network by sending first a home test initiate (HoTI) message to the local HA. The MNs may also send subsequent messages, including a care-of test initiate (CoTI) message, a home test (HoT) message, and/or a care-of test (CoT) message, which may each comprise an IPv6 extension header. The NAT64 server 170 may use a translation algorithm described in draft-ietf-behave-v6v4-xlate-23, which may not support translating such IPv6 extension headers. In this case, HoTI and similar messages may be rejected at the NAT64 server 170 and the MN 110 may receive in reply an ICMP message. To avoid this situation, the MNs 110 may not be allowed to initiate RO in the wireless access network system 100. Sending initiation messages for RO from the MN 110, including HoTI, CoTI, HoT, and CoT messages, may be disabled.

Since all RO packets (e.g., signaling and data packets) may comprise extension headers, the translation algorithm in draft-ietf-behave-v6v4-xlate-stateful-12 that may be used by the NAT64 server 170 may be configured to ignore the data included in these headers. As a result, RO may not be initiated or implemented. As such, the IPv6-only MNs 110 that communicate with the IPv4 host 150 or other IPv4-only servers may not use RO. This may ensure that all traffic between the MNs 110 and the corresponding node go through the HA 130 and IPv6-IPv4 packet translation may be properly implemented.

To handle the issues above, some extensions may be made to DSMIPv6. The extensions may include adding a flag to the BCE at the HA 130 to indicate whether a MN 110 associated with the entry is an IPv6-only MN 130. The BCE may also comprise a prefix (Pref64) that may be used to route NAT64 traffic to the NAT64 server 170. An IPv6-only flag may also be set after receiving the first IPv6 packet that comprises a synthetic IPv6 address. This flag may be used to connect the binding cache with the NAT table. Further, the HA 130 may be configured with a table of NAT64 prefixes, which may correspond to a plurality of Pref64 values that are supported in DSMIPv6 home domain and possibly its roaming partners. For each Pref64, the HA 130 may keep a 32-bit suffix, which may be concatenated to the prefix. The resulting 96-bit value may be concatenated with the IPv4 address of the destination IPv4-only server to obtain the synthesized IPv6 address. If the well-known prefix is used, then the table may comprise the prefix 64:FF9B::/96. In this case there may not be an associated suffix. Additionally, the IPv6-only MNs 110 may avoid initiating a return routability procedure described in Section 5.2.5 of RFC 3775. When the HA receives a Home Test Init message, the HA 130 may check the source address (the MN's home address) in the binding cache. If the corresponding BCE has its IPv6-only flag set, then the HA 110 may drop the HoTI message.

Additional multicast extensions may also be supported to handle the issues above. The extensions may include configuring a multicast anchor at the HA to support at least one ASM_MPREFIX64 prefix value. The multicast anchor at the HA may also support IGMP on its IPv4 interface. The HA may comprise a table of ASM_MPREFIX64 values. Typically, the table may comprise a single entry, e.g., the local prefix value. The table may be extended to comprise additional entries in case of handover, as described above. The entries may be kept as soft-state and removed after a period of inactivity. The multicast anchor at the HA may also support at least one SSM_MPREFIX64 prefix value. The multicast anchor at the HA may also support IGMP version three (IGMPv3) on its IPv4 interface since a source filtering needed for SSM may only be supported by IGMPv3. Note that PIM (Protocol Independent Multicast) protocol is also capable of supporting SSM as well as IPv4/IPv6 and as the multicast anchor at the HA may support PIM.

Additionally, IPv4-only or dual stack mobile nodes security considerations described in RFC 5555, which is incorporated herein by reference, may apply for the system and methods described above. The security considerations in RFC 5555 may not apply for the case of IPv6-only MNs that are based on RFC 3775. For the IPv4 interface of the HA, similar security consideration as described in draft-ietf-behave-v6v4-xlate-stateful-12 may apply.

Figure 2:
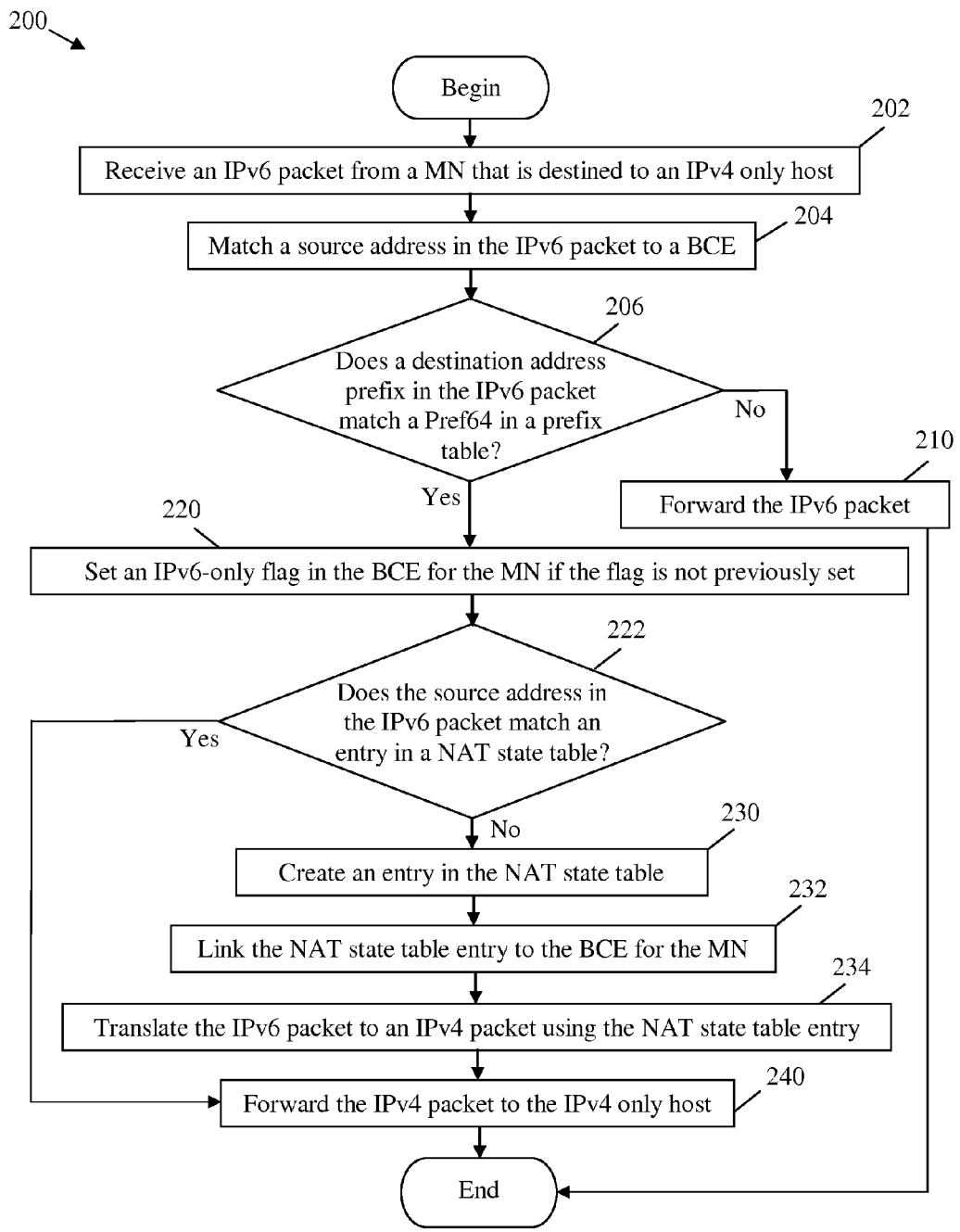
FIG. 2 is a flowchart of an embodiment of a packet translation method.

FIG. 2 illustrates an embodiment of a packet translation method 200 that may be implemented by a HA and a NAT64 server that may be collocated or separated. The method 200 may be implemented to forward a packet from an IPv6-only MN to an IPv4-only host or server. The method 200 may begin at block 202, where an IPv6 packet that is destined to an IPv4 only host may be received from a MN. The packet may comprise an IPv6 source address that may be associated with the MN and an IPv6 destination address that may be associated with the IPv4-only host and/or another destination. At block 204, a source address in the IPv6 packet may be matched to a BCE (e.g., in a binding cache at the HA). The BCE may associate the MN's address (e.g., IPv6 address) to a HA CoA. At block 206, the method 200 may determine whether a destination address prefix in the IPv6 packet matches a Pref64 in a prefix table. The prefix table may link one or more destination address prefixes to a DNS64 server. If the condition in block 206 is met, then the method may proceed to block 220. Otherwise, the method 200 may proceed to block 210.

At block 210, the IPv6 packet may be forwarded, e.g., without translation. For instance, the IPv6 packet may be destined or intended to an IPv6 host in addition to or instead of the IPv4-only host. The method 200 may then end. At block 220, an IPv6-only flag may be set, e.g., to about one, in the BCE for the MN if the flag is not previously set. At block 222, the method 200 may determine whether the source address in the IPv6 packet matches an entry in a NAT state table. If the condition in block 222 is met, then the method 200 may proceed to block 240. Otherwise, the method 200 may proceed to block 230.

At block 230, an entry may be created in the NAT state table. The entry may associate the MN's IPv6 source address and an IPv6 source port with an IPv4 interface address and an IPv4 source port. The entry may also comprise the IPv6-only flag that is set, the Pref64, and a keepalive interval. At block 232, the NAT state table entry may be linked to the BCE for the MN. At block 234, the IPv6 packet may be translated to an IPv4 packet using the NAT state table entry. The IPv4 packet may comprise an IPv4 address that corresponds to the IPv6 address and is supported by the IPv4-only host. The packet may be translated by the HA if the HA and the NAT64 server are collocated or may be sent by the HA to the NAT64 server for translation if the HA and the NAT64 server are separated. At block 240, the IPv4 packet may be forwarded to the IPv4-only host. The method 200 may then end.

Figure 3:
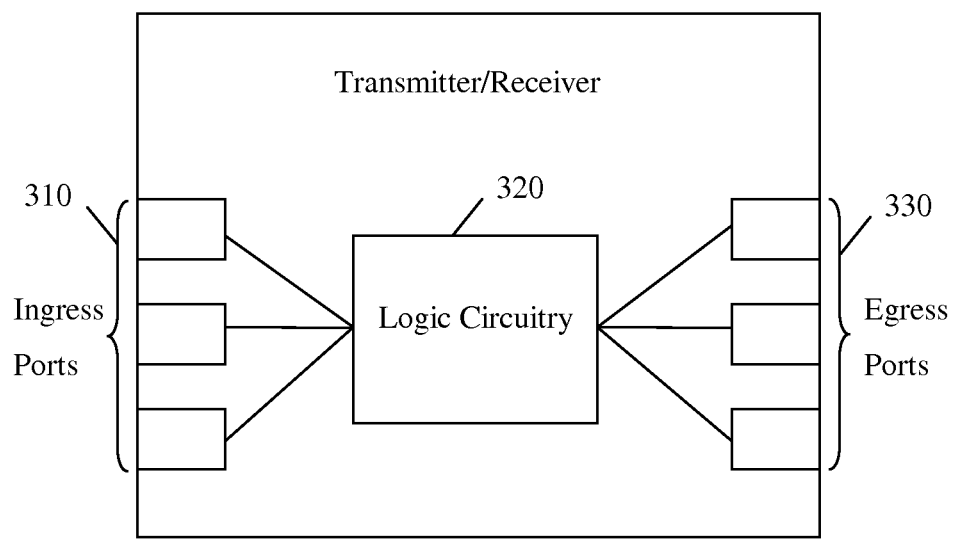
FIG. 3 is a schematic diagram of an embodiment of a transmitter/receiver unit.

FIG. 3 illustrates an embodiment of a transmitter/receiver unit 300, which may be any device that transports packets through a network. For instance, the transmitter/receiver unit 300 may be located in any of the network components described above. The transmitted/receiver unit 300 may comprise one or more ingress ports or units 310 for receiving packets, objects, or Type Length Values (TLVs) from other network components, logic circuitry 320 to determine which network components to send the packets to, and one or more egress ports or units 330 for transmitting frames to the other network components.

Figure 4:
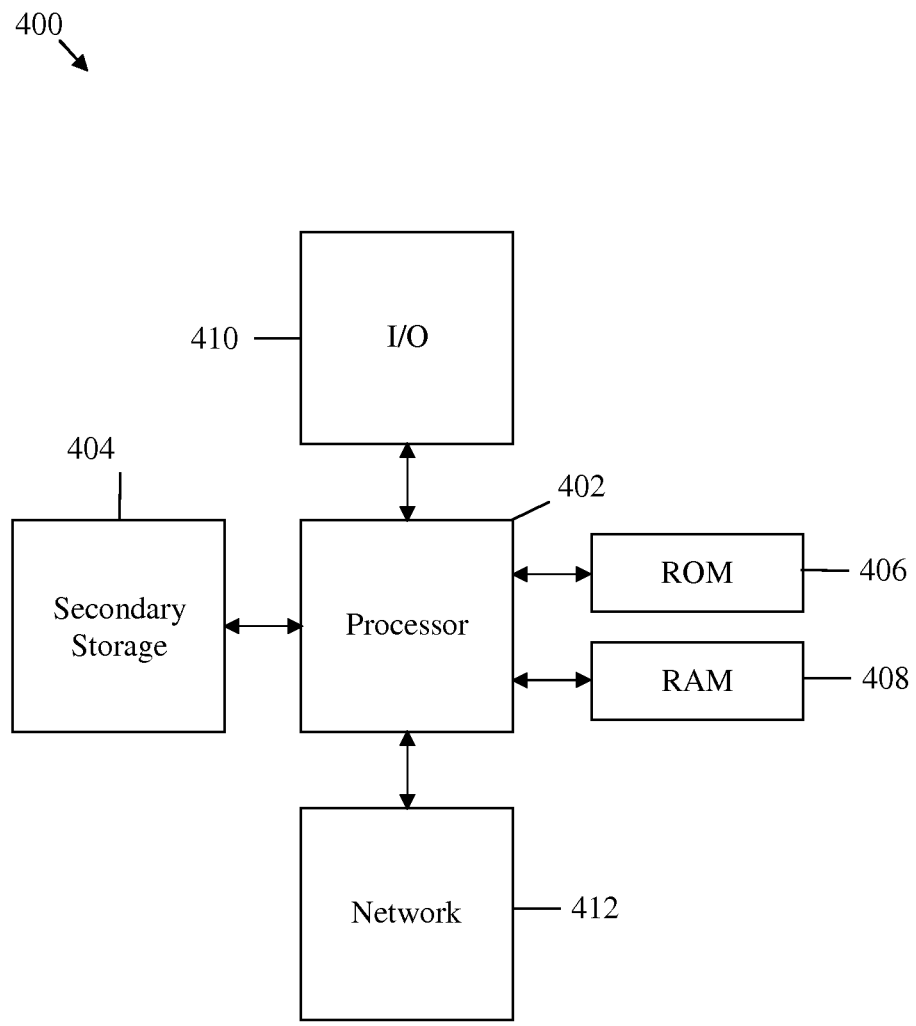
FIG. 4 is a schematic diagram of an embodiment of a general-purpose computer system.

The network components and/or methods described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a central processor unit or CPU) that is in communication with memory devices including second storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The second storage 404 is typically comprised of one or more disk drives or tape drives and is used for non-volatile storage of data and as an over-flow data storage device if RAM 408 is not large enough to hold all working data. Second storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of second storage 404. The RAM 408 is used to store volatile data and perhaps to store instructions. Access to both ROM 406 and RAM 408 is typically faster than to second storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a home agent (HA) configured to:
couple to an Internet Protocol (IP) version six (IPv6) only mobile node (MN), a network address translation (NAT) server, and an IP version four (IPv4) only host;
associate an IPv6 address for an interface with the MN with an IPv4 address for an interface with the IPv4 only host in a NAT state table entry, wherein the NAT state table entry is linked to a binding cache entry (BCE) for the MN that maps an address of the MN to a care-of-address (CoA) associated with the MN;
set an IPv6 only flag in the BCE to indicate the MN is an IPv6 only MN; and
send a plurality of keepalive messages based on a determined keepalive interval to the NAT server on behalf of the MN to refresh the NAT state table entry that is associated with the BCE for the MN,
wherein the NAT state table entry is used to translate an IPv6 packet associated with the MN to an IPv4 packet associated with the IPv4 only host.

2. The apparatus of claim 1, wherein the NAT state table entry is also used to translate an unicast IPv4 packet associated with the IPv4 only host to an unicast IPv6 packet associated with the MN.

3. The apparatus of claim 1, wherein the HA and the NAT server are collocated on the same network component where the unicast IPv6 packet is translated to the unicast IPv4 packet.

4. The apparatus of claim 1, wherein the HA maintains a prefix table for unicast communication that comprises an IPv6 prefix (Pref64) that is assigned to the NAT server by a domain name system (DNS) server.

5. The apparatus of claim 1, wherein the NAT state table entry comprises the Pref64, an IPv6 only flag that is set to indicate the MN is an IPv6 only MN, and a keepalive interval for keeping alive a communication session for the MN.

6. The apparatus of claim 1, wherein the HA is configured to handle the MN's mobility based on dual stack mobile IPv6 (DSMIPv6) and forward both IPv6 and IPv4 packets between the MN and/or other MNs and one or more hosts.

7. The apparatus of claim 1, wherein the HA is configured to support prefixes for multicast communication, and wherein the prefixes for multicast communication comprise at least one of an ASM_MPREFIX64 prefix value and a SSM_MPREFIX64 prefix value.

8. A network component comprising:
a receiver at a home agent (HA) configured to receive a multicast data packet from an Internet Protocol (IP) version four (IPv4) host;
a logic circuit coupled to the receiver and configured to:
obtain, from a network address translation (NAT) table, an IP version six (IPv6) address for the multicast data packet based on an IPv4 address in the multicast data packet;
duplicate the multicast data packet into a corresponding IPv6 packet for each mobile node (MN) that is subscribed to the IPv6 address and is associated with a binding cache entry (BCE) comprising a set IPv6 only flag indicating the MN is an IPv6 only MN; and
send keepalive messages based on determined keepalive intervals on behalf of the MNs to refresh the NAT state table entry; and
a transmitter coupled to the logic circuit and configured to send each duplicate IPv6 packet to the corresponding MN.

9. The network component of claim 8, wherein the HA sends an Internet Group Management Protocol (IGMP) join message to the IPv4 host upon receiving a multicast listener discover (MLD) join message from the MN to join a multicast group for the IPv4 host.

10. A network component comprising:
a receiver at a home agent (HA) configured to receive a multicast data packet from an Internet Protocol (IP) version four (IPv4) host;
a logic circuit configured to:
obtain, from a network address translation (NAT) table, an IP version six (IPv6) address for the multicast data packet based on an IPv4 address in the multicast data packet;
duplicate the multicast data packet for each mobile node (MN) that is subscribed to the IPv6 address into a corresponding IPv6 packet; and
send keepalive messages based on determined keepalive intervals on behalf of the MNs to refresh the NAT state table entry; and
a transmitter configured to send each duplicate IPv6 packet to the corresponding MN,
wherein the IPv4 address is a multicast group address that is added to a multicast state entry that is associated with a binding cache entry for the MN when the MN joins the multicast group, and wherein an IPv6 only flag is set in the binding cache entry for the MN.

11. The network component of claim 8, wherein the IPv6 packet comprises an IPv6 address that includes an IPv6 prefix and the IPv4 address, and wherein the IPv6 prefix is an any source multicast (ASM) prefix or a source specific multicast (SSM) prefix.

12. The network component of claim 11, wherein the ASM prefix comprises an ASM MPREFIX64 prefix.

13. The network component of claim 11, wherein the SSM prefix comprises a SSM MPREFIX64 prefix.

14. The network component of claim 8, wherein the IPv6 packet comprises the IPv6 address, an IPv6 traffic class field that corresponds to a type of service field in the multicast data packet, an IPv6 next header that corresponds to an IPv4 protocol field in the multicast data packet, a hop limit field that corresponds to a time to live (TTL) field in the multicast data packet, and an IPv6 payload that corresponds to an IPv4 payload in the multicast data packet.

15. The network component of claim 8, wherein the multicast packet is an IPv4 fragment packet, and wherein the IPv6 packet comprises an IPv6 fragment header, a fragment header that corresponds to a fragmentation offset field in the multicast data packet, an IPv6 fragment header identification field that includes a 16-bit identification field in the multicast data packet and 32 additional higher order bits that are set to zero, and a more fragment (MF) field that corresponds to a MF field in the multicast data packet.

16. The network component of claim 8, wherein the HA supports SSM and Internet Group Management Protocol (IGMP) version three (IGMPv3) on an upstream interface of the HA, and wherein the HA sends an IGMPv3 join message after receiving a multicast listener discovery (MLD) version two (MLDv2) Join message from an IPv6 only MN to a next hop router that supports IGMPv3 when the IPv6 only MN joins a source specific group (S,G).

17. A network component comprising:
a receiver at a home agent (HA) configured to receive a multicast data packet from an Internet Protocol (IP) version four (IPv4) host;
a logic circuit coupled to the receiver and configured to:
obtain an IP version six (IPv6) address for the multicast data packet based on an IPv4 address in the multicast data packet and duplicate the multicast data packet for each mobile node (MN) that is subscribed to the IPv6 address into a corresponding IPv6 packet; and
a transmitter coupled to the logic circuit and configured to send each duplicate IPv6 packet to the corresponding MN,
wherein the HA supports source specific multicast (SSM) and Protocol Independent Multicast (PIM) on an upstream interface of the HA, and
wherein the HA establishes a session with an upstream non-neighbor router to send a PIM Join message when a MN joins a source specific group (S,G).

18. A method comprising:
receiving an Internet Protocol (IP) version six (IPv6) packet from a mobile node (MN), wherein the IPv6 packet comprises a Multicast Listener Discovery (MLD) membership report for joining a multicast group;
in response to receiving the MLD membership report, setting an IPv6 only flag in a binding cache entry (BCE) for the MN that is not previously set if an IPv6 prefix in a destination address in the IPv6 packet is detected in a prefix table;
translating the IPv6 packet to an IPv4 packet using a network address translation (NAT) state table entry that matches a source address in the IPv6 packet; and
forwarding the IPv4 packet to an IPv4 only host associated with the destination address.

19. The method of claim 18 further comprising forwarding the IPv6 packet without translation if the IPv6 prefix is not found in the prefix table.

20. The method of claim 18 further comprising:
creating the NAT state table entry if the source address in the IPv6 packet is not found; and
linking the NAT state table entry to the BCE for the MN.

21. The method of claim 20 further comprising:
sending a plurality of keepalive messages based on a determined keepalive interval to a network address translation (NAT) server instead of the MN to refresh a NAT state table entry that is associated with the BCE for the MN,
wherein the keepalive messages are Internet Control Message Protocol (ICMP) Echo Request messages that each comprise a User Datagram Protocol (UDP) header and serve as outbound refresh messages for outgoing packets to the IPv4 only host.

22. The method of claim 21 further comprising receiving a plurality of keepalive messages based on a determined time interval from the NAT server to refresh the BCE for the MN, wherein the keepalive messages are ICMP Echo Reply messages that serve as inbound refresh messages for incoming packets from the IPv4 only host.

23. The method of claim 18 further comprising:
receiving a home test initiate (HoTI) message for route optimization; and
dropping the HoTI message if a source address in the HoTI message matches a BCE for the MN that has an IPv6 only flag set.

24. A computer program product for use by a home agent (HA) configured to couple to an Internet Protocol (IP) version six (IPv6) only mobile node (MN), a network address translation (NAT) server, and an IP version four (IPv4) only host, the computer program product comprising computer executable instructions stored on a non-transitory computer readable medium such that when executed by a processor cause the HA to:

associate an IPv6 address for an interface with the MN with an IPv4 address for an interface with the IPv4 only host in a NAT state table entry, wherein the NAT state table entry is linked to a binding cache entry (BCE) for the MN that maps an address of the MN to a care-of-address (CoA) associated with the MN;

set an IPv6 only flag in the BCE to indicate the MN is an IPv6 only MN; and send a plurality of keepalive messages based on a determined keepalive interval to the NAT server on behalf of the MN to refresh the NAT state table entry that is associated with the BCE for the MN, wherein the NAT state table entry is used to translate an IPv6 packet associated with the MN to an IPv4 packet associated with the IPv4 only host.

25. The computer program product of claim 24 further comprising instructions that cause the HA to maintain a prefix table for unicast communication that comprises an IPv6 prefix (Pref64) that is assigned to the NAT server by a domain name system (DNS) server.

26. The computer program product of claim 24 further comprising instructions that cause the HA to handle the MN's mobility based on dual stack mobile IPv6 (DSMIPv6) and forward both IPv6 and IPv4 packets between the MN and/or other MNs and one or more hosts.

27. A computer program product for use by a home agent (HA) configured to receive a multicast data packet from an Internet Protocol (IP) version four (IPv4) host, the computer program product comprising computer executable instructions stored on a non-transitory computer readable medium such that when executed by a processor cause the HA to:

obtain, from a network address translation (NAT) table, an IP version six (IPv6) address for the multicast data packet based on an IPv4 address in the multicast data packet;

duplicate the multicast data packet into a corresponding IPv6 packet for each mobile node (MN) that is subscribed to the IPv6 address and is associated with a binding cache entry (BCE) comprising a set IPv6 only flag that links the BCE to an associated NAT table entry; and send keepalive messages based on determined keepalive intervals on behalf of the MNs to refresh the NAT state table entry; and send each duplicate IPv6 packet to the corresponding MN.

28. The computer program product of claim 27 further comprising instructions that cause the HA to send an Internet Group Management Protocol (IGMP) join message to the IPv4 host upon receiving a multicast listener discover (MLD) Join message from the MN to join a multicast group for the IPv4 host.

29. The computer program product of claim 28 further comprising instructions that cause the HA to:

add the IPv4 address as a multicast group address in a multicast state entry that is associated with a binding cache entry for the MN when the MN joins the multicast group; and set an IPv6 only flag in the binding cache entry for the MN.

30. A computer program product comprising computer executable instructions stored on a non-transitory computer readable medium such that when executed by a processor cause a network component to:

receive an Internet Protocol (IP) version six (IPv6) packet from a mobile node (MN), wherein the IPv6 packet comprises a Multicast Listener Discovery (MLD) membership report for joining a multicast group;

in response to receiving the MLD membership report, set an IPv6 only flag in a binding cache entry (BCE) for the MN that is not previously set if an IPv6 prefix in a destination address in the IPv6 packet is detected in a prefix table;

translate the IPv6 packet to an IPv4 packet using a network address translation (NAT) state table entry that matches a source address in the IPv6 packet; and forward the IPv4 packet to an IPv4 only host associated with the destination address.

31. The computer program product of claim 30 further comprising instructions that cause the network component to:

forward the IPv6 packet without translation if the IPv6 prefix is not detected in the prefix table;

create the NAT state table entry if the source address in the IPv6 packet is not detected in the prefix table; and link the NAT state table entry to the BCE for the MN.

32. The computer program product of claim 30 further comprising instructions that cause the network component to send a plurality of keepalive messages based on a determined keepalive interval to a network address translation (NAT) server instead of the MN to refresh a NAT state table entry that is associated with the BCE for the MN, wherein the keepalive messages are Internet Control Message Protocol (ICMP) Echo Request messages that each comprise a User Datagram Protocol (UDP) header and serve as outbound refresh messages for outgoing packets to the IPv4 only host.

* * * * *